United States Patent
Farhang et al.

(10) Patent No.: US 10,780,393 B2
(45) Date of Patent: Sep. 22, 2020

(54) DEHYDROXYLATION OF MAGNESIUM SILICATE MINERALS FOR CARBONATION

(71) Applicant: Mineral Carbonation International Pty Ltd, Braddon (AU)

(72) Inventors: Faezeh Farhang, Cameron Park (AU); Eric Miles Kennedy, Newcastle (AU); Michael Stockenhuber, Maitland (AU); Geoffrey Frederick Brent, Valentine (AU); Mark Stuart Rayson, Bar Beach (AU)

(73) Assignee: Mineral Carbonation International Pty Ltd, Braddon (AU)

( * ) Notice: Subject to any disclaimer, the term of this patent is extended or adjusted under 35 U.S.C. 154(b) by 0 days.

(21) Appl. No.: 16/064,288

(22) PCT Filed: Dec. 23, 2016

(86) PCT No.: PCT/AU2016/051283
§ 371 (c)(1),
(2) Date: Jun. 20, 2018

(87) PCT Pub. No.: WO2017/106929
PCT Pub. Date: Jun. 29, 2017

(65) Prior Publication Data
US 2019/0009211 A1    Jan. 10, 2019

(30) Foreign Application Priority Data
Dec. 23, 2015    (AU) .............................. 2015905351

(51) Int. Cl.
*B01D 53/62*    (2006.01)
*B01D 53/82*    (2006.01)
(Continued)

(52) U.S. Cl.
CPC ............. *B01D 53/82* (2013.01); *B01D 53/62* (2013.01); *C01B 32/60* (2017.08); *C01B 33/22* (2013.01);
(Continued)

(58) Field of Classification Search
None
See application file for complete search history.

(56) References Cited

U.S. PATENT DOCUMENTS

| 2,398,493 A | 4/1946 | Butt et al. |
| 4,377,465 A | 3/1983 | York |

(Continued)

OTHER PUBLICATIONS

Extended European Search Report for EP Application No. 16877018.8 dated Jul. 12, 2019.
(Continued)

*Primary Examiner* — Daniel Berns
(74) *Attorney, Agent, or Firm* — Foley Hoag LLP; Alexander Akhiezer; Laura A. Wzorek

(57) ABSTRACT

This application provides a process for mineral carbonation, which process comprises the steps of: providing a bed of hydroxylated magnesium silicate mineral particles in a heating vessel; agitating the bed of particles under conditions of a sub-atmospheric pressure and at a temperature of at least 600° C. to produce particles of dehydroxylated magnesium silicate mineral; and reacting the dehydroxylated magnesium silicate mineral with carbon dioxide, carbonate ions and/or bicarbonate ions to form magnesium carbonate.

This application also provides a reactor system for carrying out the process, which includes (1) mineral from mine, (2) hydroxylated magnesium silicate mineral, (3) crushing, grinding, sizing, (4) agitated bed of particles, (5) external heating, (6) vacuum system, (7) from carbon source, (8) carbon dioxide or carbonate or bicarbonate ions in solution,
(Continued)

(9) carbonation reactions, (10) carbonate product, (11) preheat, (12) heat recovery, and (13) magnetic fraction.

18 Claims, 10 Drawing Sheets

(51) Int. Cl.
    *C01B 32/60* (2017.01)
    *C01B 33/22* (2006.01)
    *C01F 5/24* (2006.01)

(52) U.S. Cl.
    CPC .......... *C01F 5/24* (2013.01); *B01D 2251/402* (2013.01); *B01D 2251/606* (2013.01); *B01D 2257/504* (2013.01)

(56) References Cited

U.S. PATENT DOCUMENTS

| | | |
|---|---|---|
| 5,967,062 A | 10/1999 | Larson et al. |
| 2004/0213704 A1 | 10/2004 | Reed |
| 2011/0256048 A1* | 10/2011 | Brent .................. B01D 53/62 423/432 |

OTHER PUBLICATIONS

Hawk et al., "High vacuum indirectly-heated rotary kiln for the removal and recovery of mercury from air pollution control scrubber waste," Waste Management, 18(6-8):461-466 (1998).

Brindley et al., "Kinetics and mechanism of dehydroxylation processes: II temperature and vapor pressure dependence of dehydroxylation of serpentine," The American Mineralogist, 52:1697-1705 (1967).

Dlugogorski et al., "Dehydroxylation of serpentine minerals: Implications for mineral carbonation," Renewable and Sustainable Energy Reviews, 31:353-367 (2014).

International Preliminary Report on Patentability for International Application No. PCT/AU2016/051283 dated Jun. 26, 2018.

Nabertherm, "Laboratory compact tube furnaces," http://web.archive.org/web/20151107082914/http://www.nabertherm.com/produkte/details/en/labor_rohroefenzubehoer> (2015).

Pan et al., "An innovative approach to integrated carbon mineralization and waste utilization: A review," Aerosol and Air Quality Research, 15:1072-1091 (2015).

* cited by examiner

DEHYDROXYLATION OF MAGNESIUM SILICATE MINERALS FOR CARBONATION

CROSS-REFERENCES TO RELATED APPLICATIONS

This application is the U.S. national stage of International Patent Application No. PCT/AU2016/051283, filed Dec. 23, 2016, which claims the benefit of Australian Patent Application serial number 2015905351, filed Dec. 23, 2015, the contents of both of which are hereby incorporated by reference in their entireties.

FIELD OF THE INVENTION

The present invention provides a process for carbon dioxide sequestration by mineral carbonation.

BACKGROUND TO THE INVENTION

The present invention relates to a process for the permanent and safe sequestration of carbon dioxide gas. The present invention is particularly concerned with an efficient and economically viable integrated process for the chemical conversion of carbon dioxide to solid carbonates thereby enabling a reduction in the amount of carbon dioxide discharged to the atmosphere.

The sequestration of carbon dioxide gas in repositories that are isolated from the atmosphere is a developing technology that is widely recognised as an essential element in global attempts to reduce carbon dioxide emissions to the atmosphere. The rapid increase in atmospheric carbon dioxide concentrations is of concern due to its properties as a greenhouse gas and its contribution to the phenomena of global warming and climate change. Prototype demonstration facilities for carbon dioxide capture and sequestration (CCS) exist in several countries and commercial scale operations have recently also emerged. While various technologies exist for the capture and concentration of carbon dioxide from combustion flue gases, such as in coal combustion for electrical power generation, most current facilities utilise underground sequestration by injection of pressurised carbon dioxide into suitable underground repositories. This is commonly known as geosequestration. This may occur in depleted oil or gas reservoirs or other underground porous formations that are suitably isolated from the atmosphere. These reservoirs or formations may be situated under land or sea. Another possible subterranean repository for carbon dioxide gas is so-called saline aquifers. Direct storage of carbon dioxide on the floor of the deep ocean has also been investigated but has yet to be successfully demonstrated on any significant scale.

Another field of study for carbon dioxide sequestration is that known as mineral carbonation, whereby carbon dioxide is chemically reacted with alkali or alkaline-earth metal oxide or silicate minerals to form stable solid carbonates. This approach is known as ex-situ mineral carbonation, as opposed to in-situ carbonation whereby carbon dioxide is deposited into underground mineral formations and reacts over longer timeframes with suitable minerals in existing underground formations. The present invention is concerned with the ex-situ approach to carbon dioxide sequestration via mineral carbonation of alkali metal silicate minerals or alkaline-earth metal silicate minerals to form carbonates.

Mineral carbonation has a number of potential advantages over other methods of carbon dioxide sequestration. These include permanence and stability of the formed carbonates and the elimination of any risks of leakage of carbon dioxide gas. Furthermore, suitable subterranean sites for geosequestration do not exist at all locations where they are required near to carbon dioxide emission sources. The chemical reactions of mineral carbonation are also thermodynamically favoured, with an exothermic release of energy due to the formation of the carbonates. Many of the silicate minerals required for mineral carbonation are abundant and widely distributed globally. These minerals may be readily mined and subjected to known comminution and other processing technologies. They are generally benign and the environmental and safety risks are readily manageable. In particular, the magnesium silicate mineral broadly known as serpentine has been estimated to be available in quantities sufficient to sequester all global emissions of carbon dioxide from known fossil fuel reserves.

However, to achieve suitably high reactivity of the magnesium in serpentine with carbon dioxide to form magnesium carbonates, heat activation of the serpentine to remove chemically bound water (dehydroxylation) is performed. This yields a, preferably largely amorphous, magnesium silicate phase called activated serpentine according to the following formula:

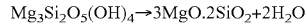

$$Mg_3Si_2O_5(OH)_4 \rightarrow 3MgO.2SiO_2 + 2H_2O$$

A comprehensive study of mineral carbonation was reported in: O'Connor, W. K., Dahlin, D. C., Rush, G. E., Gerdemann, S. J., Penner, L. R. and Nilsen, D. N., 2004. Aqueous Mineral Carbonation—Mineral Availability, Pretreatment, Reaction Parametrics and Process Studies-Final Report, DOE/ARC-TR-04-002, Albany Research Center, US DOE.

This study describes the heat activation of hydroxylated magnesium silicates by dehydroxylation and the subsequent carbonation of the activated magnesium silicates by reaction with carbon dioxide. O'Connor et al. describe a so-called single step mineral carbonation reaction (following heat activation) wherein activated magnesium silicate is dissolved in an aqueous solution and reacted with carbon dioxide to produce magnesium carbonate in a single step.

Other workers describe so-called two-step mineral carbonation reactions (following heat activation of the mineral) in which the activated magnesium silicate is dissolved in an aqueous solution in one step and then the dissolved magnesium is converted to magnesium carbonate by reaction with carbon dioxide in a second, separate step.

For example, Werner et al., describe both single and two step processes for mineral carbonation in: Werner, M., Hariharan, S., Mazzotti, M., Flue gas CO2 mineralization using thermally activated serpentine: From single to double-step carbonation. Energy Procedia, 2014, 63, 5912-5917.

In the single and two-step mineral carbonation methods it would be desirable to use activated mineral that has high reactivity with respect to carbon dioxide. It would also be desirable to produce the activated mineral in an efficient and economic manner. Activation of the mineral by heat treatment represents a large energy sink in the mineral carbonation process and needs continuing optimisation to render industrial applications viable.

The present invention seeks to provide an improved process for activation by heat treatment that render the overall process of mineral carbonation more efficient and viable than previously applied techniques.

SUMMARY OF THE INVENTION

The present invention provides a process for mineral carbonation, which process comprises the steps of:

providing a bed of hydroxylated magnesium silicate mineral particles in a heating vessel;

agitating the bed of particles under conditions of a sub-atmospheric pressure and at a temperature of at least 600° C. to produce particles of dehydroxylated magnesium silicate mineral; and reacting the dehydroxylated magnesium silicate mineral with carbon dioxide, carbonate ions and/or bicarbonate ions to form magnesium carbonate.

In accordance with the present invention, agitation of the mineral particles under conditions of sub-atmospheric pressure and a temperature of at least 600° C. has been found to provide improved activation of the mineral with respect to its reactivity in subsequent carbonation reactions.

It is preferred that the particles are agitated in a continuous manner, or at least frequently on the order of every five minutes or less if done sporadically, under these conditions. It has been found that heating under these conditions for a relatively short period of time (possibly about 10 to 180 minutes) may provide suitably activated mineral that has increased reactivity in mineral carbonation processes. The activated mineral may exhibit increased solubility in moderately acidic aqueous solutions used to perform the carbonation reactions than mineral activated under a nitrogen purge gas or under other conditions of heat activation such as without agitation.

The present invention also provides a reactor system adapted to perform the process of the present invention. The reactor system comprises a heating vessel for receiving a bed of hydroxylated magnesium silicate mineral particles, a mechanism for heating the bed of particles, a mechanism for evacuating the heating vessel to provide sub-atmospheric pressure and a mechanism for agitating particles during heating under sub-atmospheric pressure.

Sub-atmospheric pressure (partial vacuum) may be provided by a vacuum system. A particularly advantageous embodiment of the invention provides a vacuum system that comprises a condensing heat exchanger in combination with a vacuum pump. The condensing heat exchanger reduces the pressure by condensation of steam evolved during dehydroxylation through cooling.

Agitation may be provided by mechanical stirring, shaking or vibration or by rotation, for example in a cylindrical heating vessel. Other forms of agitation may also be applied, for example by fluidising or partially fluidising the particles within a fluidised bed operated at sub-atmospheric pressure. Various combinations of these forms of agitation may be used, for example fluidisation in combination with mechanical stirring and/or vibration, or rotation in combination with mechanical stirring or vibration.

It is preferable to recover as much of the sensible heat from the mineral particles as possible after heat activation. In this regard, heat transfer from the heated mineral particles to a fluid or gas may be applied to the heat activation process. An example is heat transfer to air that is pre-heated for use in a combustion process that is employed to supply the heat required for mineral activation. Another example is heat transfer to air that is used to pre-heat the mineral before entering the heat activation heating vessel. Pre-heating of the mineral involves elevating the temperature of the mineral to a temperature below 600° C. This can improve the overall efficiency of the process of the invention. Pre-heating can take place in the heating vessel or in another vessel with pre-heated mineral particles then being transferred (with minimal cooling) to the heating vessel in which thermal activation takes place. Pre-heating may involve heating the mineral particles to a temperature of from 200 to 600° C., for example from 200 to 500° C.

It is also preferable to recover as much of the sensible heat from the combustion flue gases from such a process as possible. This recovered heat may also be used elsewhere such as in preheating combustion air. Several stages of heat transfer may advantageously be employed to recovering heat from the mineral and the combustion flue gases.

After it has been activated, the mineral is used in carbonation reactions. Thus, the activated mineral is reacted with carbon dioxide, carbonate ions and/or bicarbonate ions, preferably in aqueous solutions, in order to form magnesium carbonates. The carbonate ions or bicarbonate ions are typically derived from dissolved carbon dioxide in aqueous solutions. Either so-called single step or two step mineral carbonation processes, as described earlier, can be used.

In order to render the overall process more favourable in terms of energy consumption and net greenhouse gas sequestration, an industrial process requires that the heat applied to the heating vessel is sourced directly from combustion of hydrocarbonaceous fuel, as opposed to indirectly from electrical heating. Direct heat activation of the mineral in this way is described in published international patent applications WO2008/061305 and WO2010/022468, the contents of which are incorporated herein by reference. An exception to this in terms of net greenhouse gas emissions applies for regions where electricity is not derived from fossil fuel combustion processes.

In the context of the present disclosure, mineral carbonation refers to an overall reaction in which carbon dioxide or carbonate ions or bicarbonate ions is reacted with (activated) magnesium silicate-containing mineral to form magnesium carbonate. The carbonate is recovered as a solid from the carbonation reactions. The reactions may be undertaken in aqueous solution with the carbonate precipitating out of solution. Reference to aqueous solutions includes solutions in which water is the major liquid constituent (greater than 50% by mass) and includes solutions containing other dissolved species or minor (less than 50% by mass) liquid phases. Sea water, brines and saline solutions may be used. The reference to aqueous solutions also embraces those solutions containing undissolved solids, which may be in suspension.

The present invention may provide significant improvements over previous mineral carbonation processes, rendering the overall process more energetically and economically favourable than might have been expected and thus more competitive than the previous processes. The present invention may also be implemented without the need for any added chemical reagents, such as acids or bases, as might be required in other known processes. The present invention may therefore provide a more favourable means of conversion of carbon dioxide into stable magnesium carbonates thereby enabling a reduction in the amount of carbon dioxide discharged to the atmosphere.

Embodiments of the invention may be implemented under energetically beneficial operating conditions (of pressure and temperature) when compared with those conditions used conventionally for ex situ mineral carbonation. Embodiments of the invention may be implemented using carbon dioxide feed streams that contain acidic and/or other impurities at higher levels than conventional processes have otherwise allowed.

Definitions

Hydroxylated magnesium silicate mineral:

Minerals such as serpentine, comprising magnesium silicates with chemically-bound water or hydroxyl groups.

Dehydroxylated magnesium silicate mineral:

The magnesium silicate remaining after removal of a substantial proportion (greater than 50%) of the hydroxyl groups originally present in the mineral as a result of heat activation.

Bed:

Here the term is taken to describe a collection or amassment of particles in a pile or formation that is deeper or thicker than a single layer of the largest particles.

Lizardite, antigorite, chrysotile:

Serpentine mineral polymorphs.

Magnesium carbonates:

Compounds containing the carbonate ion combined with magnesium. Other chemical species such as water or hydroxyl groups may be bound in the compounds.

Thermally activated magnesium silicate mineral:

Magnesium silicate mineral, such as serpentine, that has been heated to remove chemically-bound water or hydroxyl groups from within the structure of the mineral.

Single step aqueous mineral carbonation:

Mineral carbonation conducted in aqueous media involving mineral dissolution and formation of magnesium carbonate within the same single process step.

Two step aqueous mineral carbonation:

Mineral carbonation conducted in aqueous media involving mineral dissolution and formation of magnesium carbonate as independent/separate process steps.

Sub-atmospheric pressure:

The prevailing pressure following partial evacuation of the heating vessel (by removal of gases and vapours from the heating vessel). The term "partial vacuum" means the same herein as sub-atmospheric pressure.

Agitating:

In the current invention terms such as agitating and agitation refer to movement of the mineral particles both within the bed of particles (causing relative motion between particles) and movement of the particles relative to the (inner) surfaces of the heating vessel. In accordance with the invention various means may be employed to achieve the necessary agitation to achieve these outcomes.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavour to which this specification relates.

BRIEF DESCRIPTION OF THE DRAWINGS

Embodiments of the present invention are illustrated with reference to the accompanying non-limiting drawings in which.

KEY TO FIGURES

Figure 1:
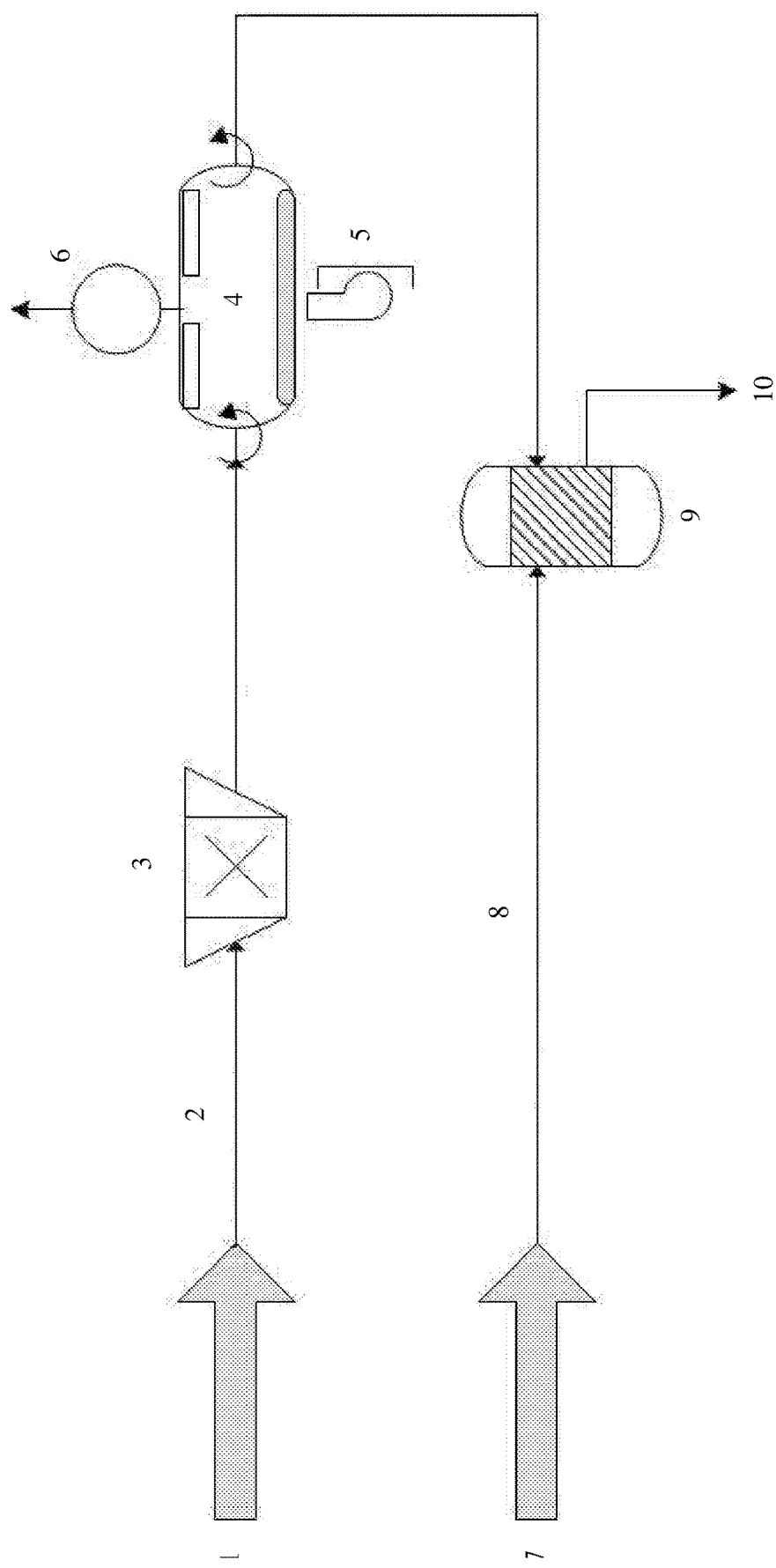
FIGS. 1-3 are schematics as referred to in Embodiments 1-3 below.
Figure 2:
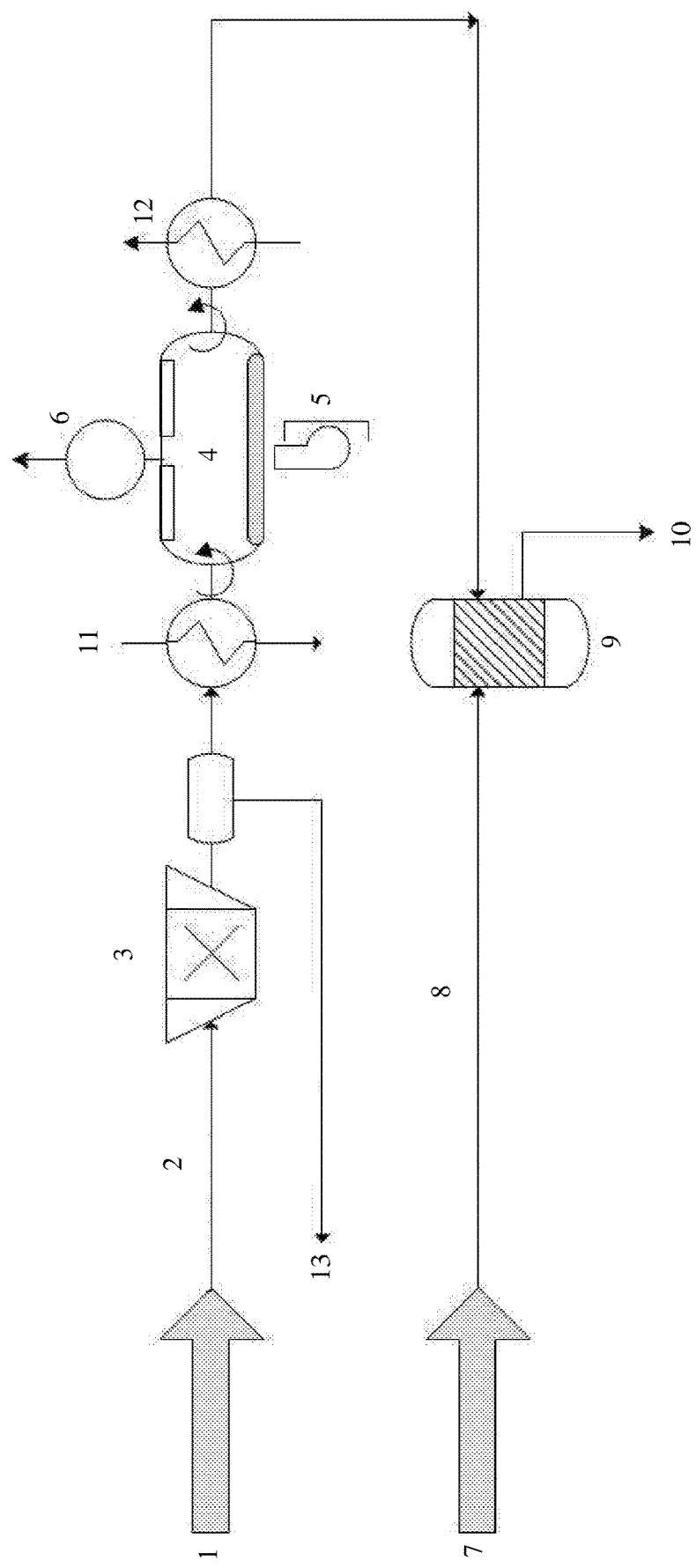
Figure 3:
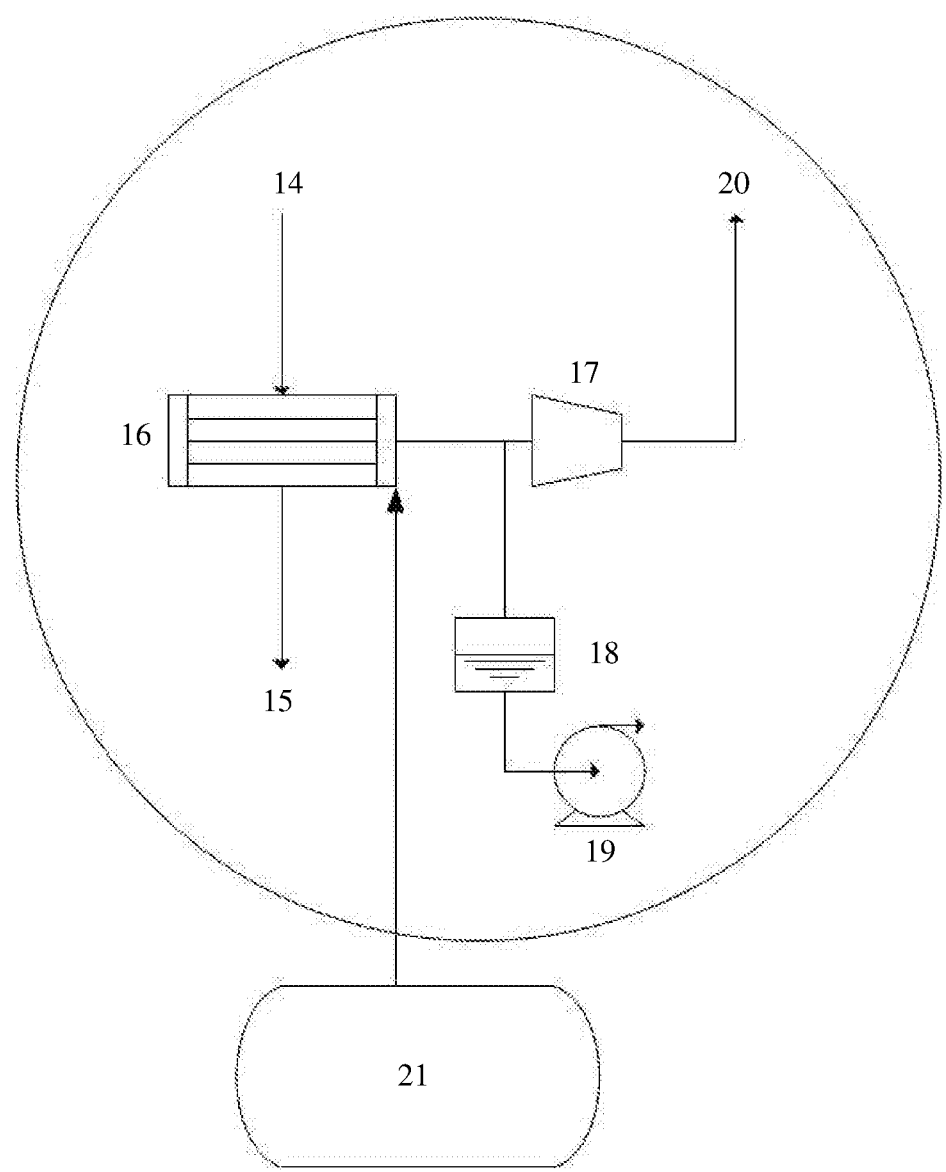
Figure 4:
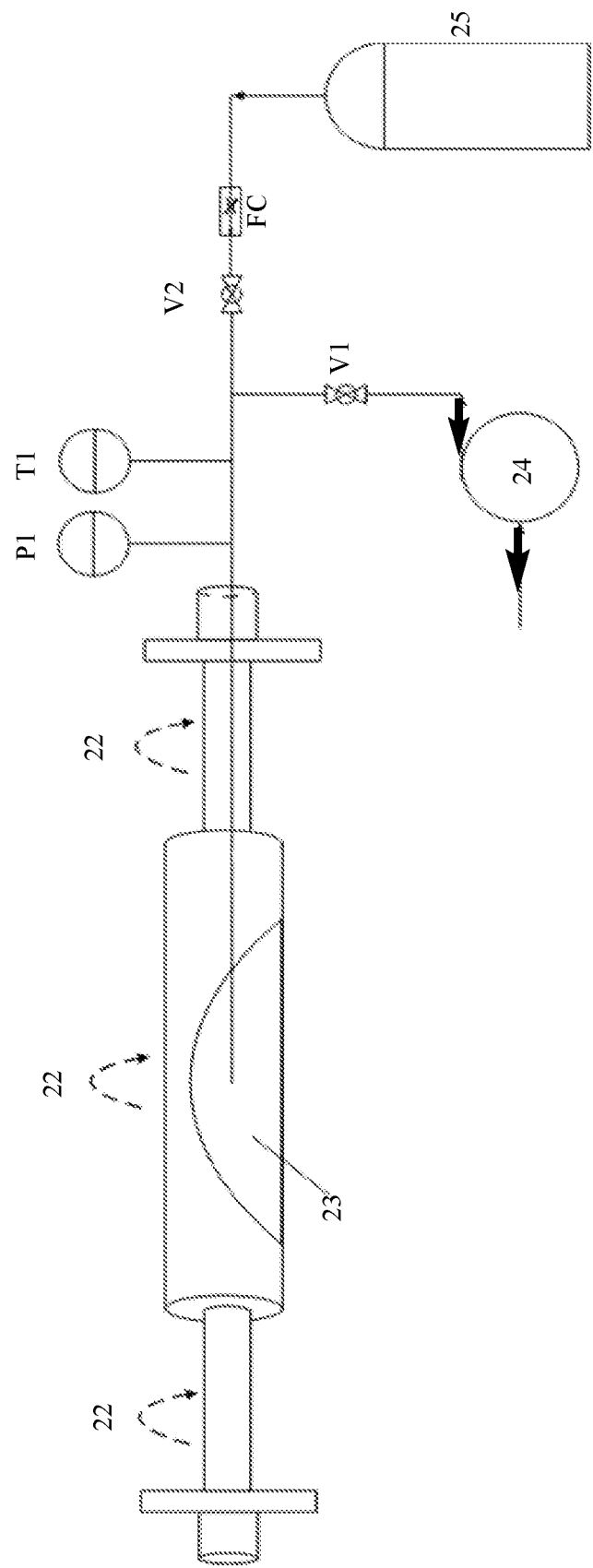
FIG. 4 is a schematic diagram of a laboratory set-up for experiments that demonstrate heat activation of serpentine under conditions of the invention.
Figure 7:
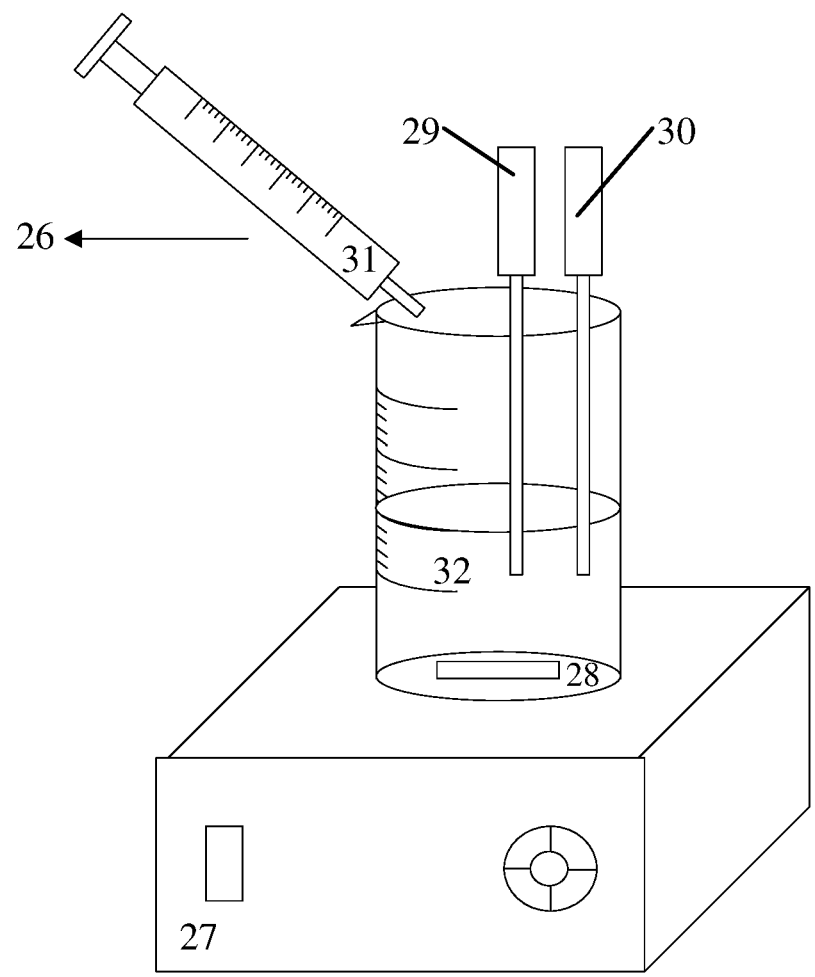
FIG. 7 is a schematic of an experimental arrangement described in Example 2.
Figure 10:
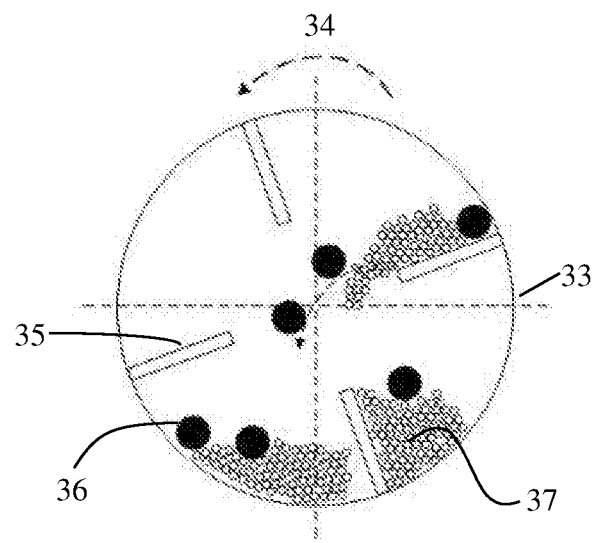
FIG. 10 is a schematic (cross-section) of a rotary kiln as referred to in Example 3.

FIGS. 1 and 2
1 Mineral from mine
2 Hydroxylated magnesium silicate mineral
3 Crushing, grinding, sizing
4 Agitated bed of particles
5 External heating
6 Vacuum system
7 From carbon source
8 Carbon dioxide or carbonate or bicarbonate ions in solution
9 Carbonation reactions
10 Carbonate product
11 Pre-heat
12 Heat recovery
13 Magnetic fraction
   FIG. 3
14 Cooling medium (e.g., water) in
15 Cooling medium (e.g., water) out
16 Condensing heat exchanger
17 Vacuum pump
18 Condensate tank
19 Condensate pump
20 Non condensibles
21 Agitated heating vessel
   FIG. 4
22 Rotation
23 Bed of powdered serpentine in rotary kiln
24 Vacuum pump
25 $N_2$ cylinder
$V_1$, $V_2$ valves
FC Flow controller
P1 Pressure sensor
T1 Temperature sensor
   FIG. 7
26 To optical emission spectrometer after being filtered
27 Magnetic stirrer
28 Magnetic bar
29 Temperature indicator
30 pH meter
31 Sampling syringe
32 Acidic buffer solution
   FIG. 10
33 Walls of heating vessel (rotary kiln)
34 Rotation
35 Lifters
36 Stainless steel balls
37 Mineral particles

DETAILED DESCRIPTION OF THE INVENTION

Without wishing to be bound by theory it is believed that agitation of the mineral particles within the heating vessel leads to a number of advantages with respect to activation of the mineral. Thus, agitation may cause continual movement and re-distribution of particles within the bed. One consequence of this is that particles at the outermost surfaces of the bed and particles in contact with internal surfaces of the heating vessel used are continuously being replaced/refreshed with other particles. This may lead to enhanced heat transfer by conduction between particles and between particles and inner surfaces of the heating vessel. Agitation of the particles may also cause surface abrasion, shearing and/or cleavage of particles thereby exposing fresh reaction surfaces. These factors, particularly in combination with exposure to a partial vacuum, may contribute to a rapid release of water (as steam) from the bed of particles as dehydroxylation proceeds. The combination of agitation with exposure to partial vacuum has been found to be particularly advantageous.

The process for the present invention involves providing a mass (bed) of particles of hydroxylated magnesium silicate mineral, preferably serpentine mineral, within a heating vessel that is provided with a mechanism (means) of agitating the particles during heating and a mechanism (means) of reducing the pressure within the vessel by application of sub-atmospheric pressure, for example by providing a partial vacuum.

In the examples described herein an electrically-heated rotary kiln has been used in laboratory experiments to demonstrate the improved reactivity of activated mineral obtained by applying the invention. However, various other heating vessel configurations are possible, and indeed preferable, in larger scale application. Heating may preferably be supplied by combustion of gaseous fuel such as natural gas or methane, or by combustion of liquid fuels such as fuel oil, or by combustion of solid fuels such as coal. Heating may be conducted stage-wise in a series of heating vessels at progressively higher temperatures, with the final dehydroxylation temperature being applied in the final vessel in the series.

The interior of the dehydroxylation heating vessel is maintained at a temperature of at least 600° C., for example, in the range 600-700° C., while agitation and partial vacuum are applied. Agitation may be supplied by mechanical means such as a stirrer or paddle within the bed of particles or a means of vibrating the heating vessel. Cylindrical vessels are particularly suited to agitation by rotation of the vessel, enabling control of the movement of the particles by variations in the rotational velocity, the volume of particles relative to volume of the vessel and the use of internal structures such as lifting veins, fins or ribs. Preferably, the bed of particles is agitated to cause movement of the particles relative to the internal surfaces of the vessel as well as relative movement between particles, leading to improved mixing, heat transfer and exposure of surfaces of the particles to the applied partial vacuum. A tumbling or cascading motion within the vessel as it rotates may be particularly advantageous in this process.

The temperature employed may vary depending upon the silicate mineral being used. Dehydroxylation of lizardite (a common serpentine species) occurs at temperature of around 630° C., while dehydroxylation of another common polymorph, antigorite, occurs at temperatures around 670° C. Full dehydroxylation of the material requires a certain period of time at these temperatures (for example 2 hours as utilised by O'Connor et al.). On the other hand, prolonged heating and the use of higher temperatures leads to recrystallization of the amorphous phases and formation of forsterite and silica.

The applied sub-atmospheric pressure may be achieved through the use of a suitable vacuum system that withdraws air and any other gases as well as steam from the heating vessel. Preferably, this system comprises a condensing heat exchanger that condenses steam released during dehydroxylation thereby reducing the system pressure. A vacuum pump may also be employed to remove non-condensable gases and maintain and control vacuum pressures.

Entrained solids may be removed prior to the vacuum pump and these may be recovered for use in the mineral carbonation process. The condensed water vapour may also be used in the mineral carbonation process. Preferably the pressure will be substantially reduced below atmospheric pressure within the heating vessel prior to or during heating and agitation of the particles, more preferably to absolute pressures below 0.2 atmospheres. Most preferably the absolute pressure will be reduced below 0.05 atmospheres.

Within the agitated heating vessel where dehydroxylation under partial vacuum occurs, the average particle size of the mineral particles is typically less than 5 mm. The particles may be considerably finer than this, for example all passing a 75 micron sieve. To achieve a suitable starting average particle size it may be appropriate to subject hydroxylated magnesium silicate mineral to prior crushing, milling and/or grinding.

Various ways of implementing the invention are illustrated with reference to the following non-limiting embodiments.

Embodiment 1

Embodiment 1 is shown schematically in FIG. 1. In this embodiment, a hydroxylated magnesium silicate mineral is mined, crushed and milled to a chosen particle size, typically all passing a 250 micron sieve. The particulate mineral is then provided as a bed of particles in a kiln. The kiln may be a gas-tight rotary kiln furnace that is then evacuated and held under partial vacuum at an absolute pressure of less than 0.5 atmospheres by a vacuum system. The kiln may be fitted with internal structures such as blades, fins or lifters to ensure that when the kiln is rotated the bed of mineral particles is agitated causing relative motion between particles and between particles and the internal surfaces of the kiln. Alternatively, the kiln may comprise a fluidised or partially fluidised bed wherein the outlet pressure of the fluidising gas is sub-atmospheric, preferably below 0.5 atmospheres and more preferably below 0.2 atmospheres. Such a flow of gas may optionally be augmented by mechanical agitation or vibration of the bed of particles.

The kiln is heated to achieve heating of the mineral to a temperature of at least 600° C., depending upon the dehydroxylation temperature of the mineral.

The bed of particles is thicker (or deeper) than the maximum particle size, meaning it comprises at least more than one layer of particles. The bed may fill a percentage of the free internal volume of the kiln in the range 5 to 80%, preferably 10 to 75% and more preferably 15 to 60%.

In the case of a rotary kiln it is agitated to provide relative motion between the bed of particles and the internal surfaces of the kiln and between particles within the bed itself. The kiln may be rotated at speeds between 1 and 100 revolutions per minute (rpm), preferably between 2 and 50 rpm and most preferably between 3 and 30 rpm. Internal structures such as blades, fins or lifters further facilitate heat transfer from the heated internal surfaces of the vessel to the particles.

In the case of a fluidised or partially fluidised bed, the relative motion between particles in the bed and between particles and the walls of the vessel is provided by the fluidising gas. It must be noted that full fluidisation is not essential for the purposes of the invention; agitation may be provided by partial fluidisation, slugging, or simply by providing a gas flow through the bed. Such a flow of gas may optionally be augmented by mechanical agitation or vibration of the bed of particles.

Alternatively, a means of vibrating the bed may of itself provide sufficient agitation of the bed of particles.

Following heating the mineral is contacted with carbon dioxide or carbonate ions or bicarbonate ions in a mineral carbonation process that comprises a single step or two steps to form magnesium carbonate and silica. This is typically performed in one or more subsequent reaction vessels held at different process conditions to the kiln. Preferably, following recovery of heat from the activated mineral, it is contacted with carbon dioxide or carbonate ions or bicarbonate ions in aqueous solution.

Embodiment 2

Embodiment 2 is shown schematically in FIG. 2. In this embodiment, a hydroxylated magnesium silicate mineral is mined, crushed and milled to a chosen particle size, typically all passing a 250 micron sieve. Here, a magnetic fraction rich in iron may optionally be removed to recover the iron and other metals as saleable by-products and to reduce the mass load to the heat activation process. The remaining mineral is pre-heated to a temperature of 200-600° C. before being provided in a bed in a gas tight rotary kiln furnace that is held under partial vacuum by a vacuum system at an absolute pressure of less than 0.2 atmospheres. The kiln has the same design features and operating parameters as in Embodiment 1 to ensure that the bed of mineral particles is agitated causing relative motion between particles and between particles and the internal surfaces of the kiln during heating of the mineral to a final temperature of at least 600° C., preferably in the range 630-680° C. Following heating for a specified period of time (for example 10-180 minutes), the activated mineral may be discharged into a heat exchanger to recover heat for use elsewhere in the process, such as preheating the mineral or other stream such as air used in the combustion of fuel to provide the heat for activation. Heat is also recovered from the combustion flue gases before discharging them from the process. The cooled mineral is then contacted with carbon dioxide or carbonate ions or bicarbonate ions in a mineral carbonation process that comprises a single step or two steps to form magnesium carbonate and silica. This is typically performed in one or more subsequent reaction vessels held at different process conditions to the kiln. Preferably, following recovery of heat from the activated mineral, it is contacted with carbon dioxide or carbonate ions or bicarbonate ions in aqueous solution.

Embodiment 3

In this embodiment a particular vacuum system that is highly advantageous is described. This vacuum system may be applied to the reactor system described in Embodiments 1 and/or 2.

In Embodiment 3 the partial vacuum is provided by a vacuum system that reduces the pressure through condensation of steam that is released from the mineral during dehydroxylation as a result of heating. FIG. 3 shows the vacuum system.

A reduced pressure inside the heating vessel is generated, in part or in full, by a condensing heat exchanger, which condenses steam produced during the dehydroxylation of the mineral. The vacuum system comprises an externally heated, agitated gas tight dehydroxylation vessel, a heat exchanger, connected to the reaction vessel by a conduit (e.g. a pipe) and cooled by a supply of a cooling medium (e.g. water), a vacuum pump for the removal of non-condensable gases, a condensate tank for the collection of condensate from the heat exchanger, and a condensate pump to control the level in the condensate tank.

The supply of cooling medium to the heat exchanger results in a decrease in temperature on the steam side of the heat exchanger, causing the steam to condense to liquid water.

The reduction in volume of the steam upon condensation results in a decrease in pressure within the heat exchanger. The pressure in the heat exchanger is governed by the temperature on the steam side of the heat exchanger (in accordance with the liquid-vapour equilibrium) and the presence of non-condensable impurity gases. The non-condensable gases are removed by a vacuum pump. It should be noted that if incursion of impurity gases, such as air, into the system is eliminated, then the vacuum pump is not required during steady state operation. The reduced pressure at the heat exchanger results in a pressure difference between the heat exchanger and the reaction vessel, resulting in a flow of vapour from the vessel to the heat exchanger, thereby evacuating the reaction vessel.

Generating a vacuum by means of a condensing heat exchanger is highly advantageous because it reduces the electrical energy requirement for running a vacuum pump to produce the reduced pressure conditions within the reaction vessel. For example, the adiabatic energy required to compress steam from 5 kPa (absolute) to atmospheric pressure is approximately 30 kWh per ton of serpentine processed, assuming an steam inlet temperature to the vacuum pump of 100° C. This is approximately equivalent to the energy that would be required by a vacuum pump for the evacuation of the steam and reducing the pressure in the vessel from atmospheric pressure to 5 kPa absolute. Using the condensing heat exchanger allows this energy cost to be eliminated by simply providing cooling water to maintain the heat exchanger temperature at a low temperature, typically 30-45° C.

The kiln has the same design features and operating conditions as in Embodiment 1 to ensure that the bed of mineral particles is agitated causing relative motion between particles and between particles and the internal surfaces of the kiln during heating of the mineral to a final temperature of at least 600° C., preferably 630 to 680° C. Following heating for a specified period of time, the activated mineral may be discharged into a heat exchanger to recover heat for use elsewhere in the process, such as preheating the mineral or other stream such as air used in the combustion of fuel to provide the heat for activation. Heat is also recovered from the combustion flue gases before discharging them from the process and may also be used in preheating combustion air. The cooled mineral is then contacted with carbon dioxide or carbonate ions or bicarbonate ions in a mineral carbonation process that comprises a single step or two steps to form magnesium carbonate and silica. This is typically performed in one or more subsequent reaction vessels held at different process conditions to the kiln. Preferably, following recovery of heat from the activated mineral, it is contacted with carbon dioxide or carbonate ions or bicarbonate ions in aqueous solution.

Advantages/Use

The present invention may be implemented to provide an activated magnesium silicate that is more soluble in aqueous media and more reactive with carbon dioxide or carbonate ions or bicarbonate ions in solution to form magnesium carbonate, than alternative processes described heretofore. These advantageous properties of the activated mineral are believed to be due to the simultaneous agitation and heating of the mineral under partial vacuum.

The present invention may be implemented to provide a process for the activation of the magnesium silicate that requires less overall energy input than alternative processes described heretofore. This advantage is believed to be due to the use of agitation while exposed to a sub-atmospheric pressure (i.e. partial vacuum) within the heating vessel. This requires a lower heat input into the heating vessel and reduces heat losses due to purge gases in alternative processes described heretofore. In particular, the use of a condensing heat exchanger in the vacuum system to provide or supplement the partial vacuum (for example as described in Embodiment 3) may reduce the energy requirement considerably, by reducing the duty of a vacuum pump.

The present invention is illustrated with reference to the following non-limiting examples.

EXAMPLES

Material: material used for these examples was raw serpentine from great serpentine belt, NSW, Australia, containing minor impurities. As detected by XRD powder diffraction method the bulk of the material appears to be lizardite rather than antigorite or chrysotile. The loss on ignition (LOI) in Argon was 12.23% which is slightly less than the water content derived from the theoretical formula $Mg_3Si_2O_5(OH)_4$; namely 13.04%.

Considering other impurities including 2.4% FeO and 2.4% $Fe_2O_3$ given by chemical analysis, the expected weight loss is in agreement with the observed experimental value.

Sample preparation: The material was crushed, ground, wet sieved and magnetically treated to remove a proportion of the iron minerals. Experiments were then carried out with dried powdered serpentine with particle sizes less than 75 μm.

Equipment (see FIG. 4): Heat activation processes have been performed experimentally in an electrically heated rotary kiln (RSR 80/500/11, Nabertherm, Germany) with batch quartz tube (500 mm length and 80 mm OD). While an industrial process would be rendered more favourable in terms of energy consumption and net greenhouse gas sequestration if the heat applied to the heating vessel was supplied by combustion of hydrocarbonaceous fuel, in these controlled experiments it is more convenient to use electrical heating to demonstrate the activation process.

The kiln is equipped with a thermocouple that is positioned in the bed of material and the actual temperature of bed is controlled by heating. The kiln is also connected to a vacuum pump (Sogevac SV 16, Oerlikon, Germany) and a nitrogen cylinder (Coregas, grade 5). The vacuum pump is capable of providing vacuum at −0.95 atmospheres (0.05 kPa absolute). For the control experiments using a purge gas the nitrogen flow rate was controlled by three mass flow controllers (Brooks Instrument). Using V1 and V2 it is possible to run the kiln either in N2 atmosphere or under partial vacuum. FIG. 4 shows a schematic of the experimental set up. The kiln was rotated during heating such that motion was induced in the bed of particles with relative motion between the particles and between the particles and the internal surfaces of the kiln.

Heating procedure: For each run 140 g of the powder material was weighed with a laboratory balance (PS 8000.R1, NUWEIGH, Australia) and loaded into the rotary kiln quartz tube. The material was evenly distributed in the tube. The system was then closed tight and evacuated using the vacuum pump. Rotation of the kiln was commenced such that motion was induced in the bed of particles and the heating program was commenced.

The vacuum pump was running continuously until the heating program was ended. For the experiments under nitrogen, mass flow controllers were used to provide a constant nitrogen flow of 80 l/h. The heating program was set as follows:

Step 1: heating from room temperature (20° C.) to the desired temperature (T) at a constant rate of 600° C./h.

Step 2: heating the material at the desired temperature for a certain period of time (heating period varied between 30 min to 3 h).

Step 3: cooling down the kiln at a rate of 350° C./h from the desired temperature to room temperature (20° C.).

When the cooling process commenced the vacuum pump was stopped. After the kiln was cooled, air was introduced to the system to bring it back to atmospheric pressure (for those experiments carried out under partial vacuum). Then the activated material was taken out of the quartz tube and kept in a closed plastic container for further analyses by X-ray powder diffraction (XRD).

The XRD patterns were analysed quantitatively using internal standard method (doping method). Silicon (99.9% pure, Grade 300, Rowland Ltd., UK) was used as an internal standard. This method is briefly explained in the following paragraphs:

Doping Method: If the reference intensity ratio of the analytical phase i is known, then its concentration can be determined by doping the original sample. This is done by adding a known amount of a foreign compound x of which the RIR is known. After measuring the doped sample, the concentration $C_i$ in the original sample is calculated:

$$C_i = A_x \frac{I_i}{I_x} \cdot \frac{RIR_x}{RIR_i} \quad \text{(eq. 1)}$$

Where $A_x$ is the known amount of dopant x (here Si) added to the original sample relative to the original weight.

$I_i$, $I_x$: net intensities of phases i and x in the doped sample.

$RIR_i$, $RIR_x$: reference intensity ratio values of i and x respectively.

1. A homogenous mixture of 20% Si and 80% heat activated sample was prepared to scan with XRD.
2. The obtained XRD pattern was analysed and all the phases available in each sample were identified.
3. The area under the main peak of each phase was determined. The peak should not overlap any other peak.
4. The RIR value of each phase was found in the literature.
5. The concentration $C_i$ of each phase was calculated using equation 1.

Using this doping method the main crystalline phases were quantified. The summation of all phases shows the total amount of crystalline material in the sample. It was assumed that the rest of the material was amorphous, therefore not detectable by XRD. The summation of remaining lizardite and formed forsterite were considered as the main important factor to compare the reactivity of the material.

A set of experiments have been performed to find the optimum conditions of serpentine heat treatment process. Heating temperature, heating duration and atmosphere are the main influencing factors that need to be optimised. In particular the effect of applied partial vacuum with simultaneous agitation of serpentine during heat treatment has been studied and compared with a control using a nitrogen purge gas flow. To show the effectiveness of the method the results were compared to the control samples activated under nitrogen purge gas with the flowrate of 80 l/h.

Example 1

For both the control sample and the sample using the new method the final temperature of the kiln was set to 655° C.

Figure 5:
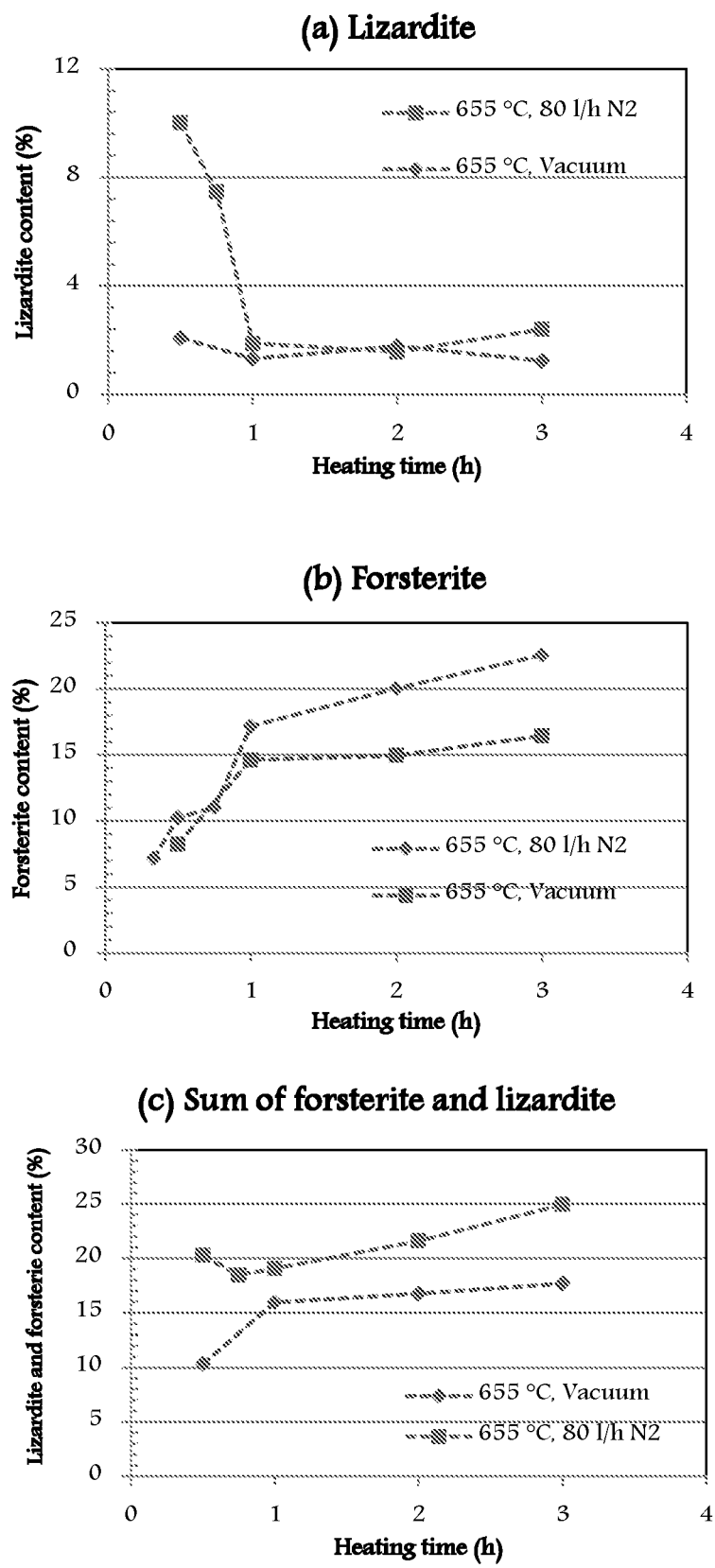
FIGS. 5, 6, 8, 9 and 11 illustrate experimental results obtained in the examples.

The results are summarised in FIG. 5 (a-c). The graphs plot the relative amounts of crystalline phases from the quantitative XRD analyses and show that the amount of remaining lizardite and formed forsterite is lower when the materials were activated with agitation under vacuum than in the control samples that were heat activated under a nitrogen purge.

Example 2

In this example both the control sample and the sample using the new method were heated to a final temperature of 630° C.

Figure 6:
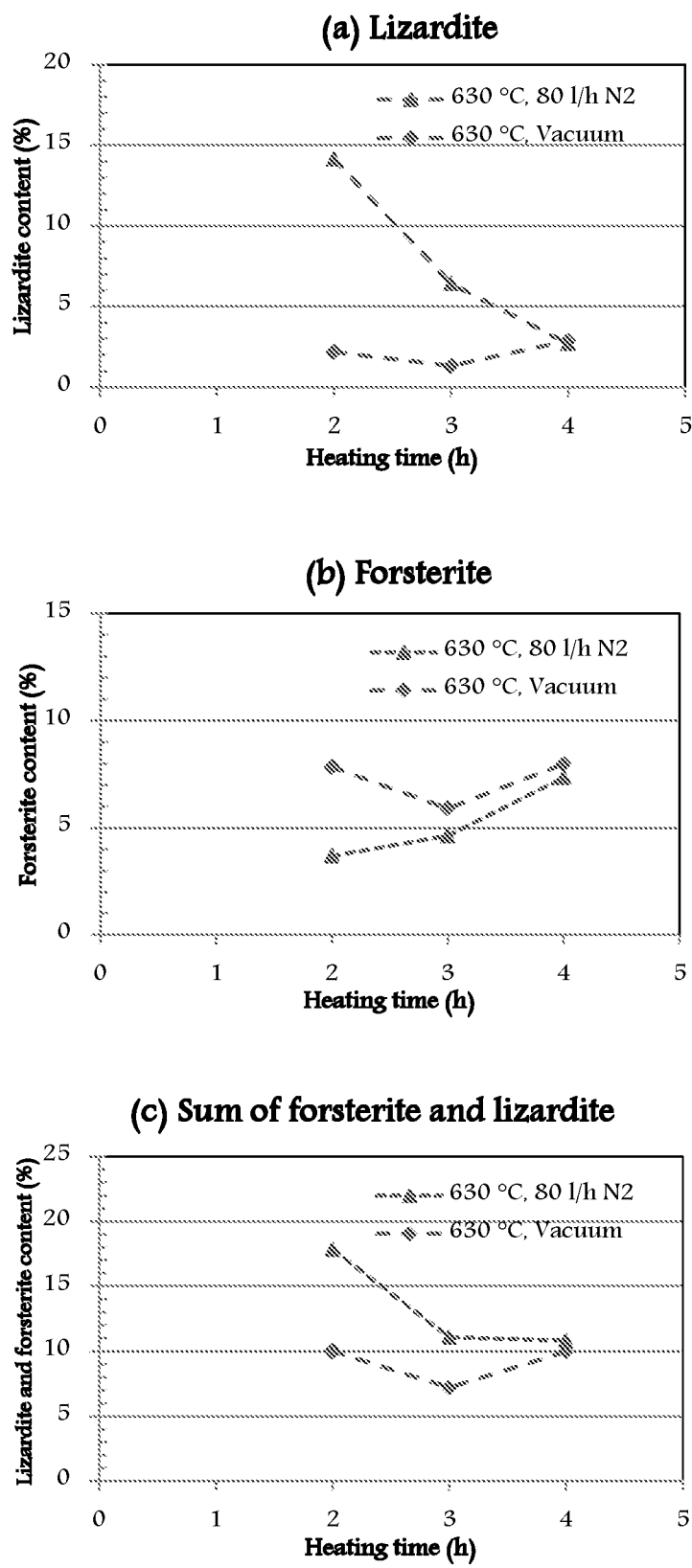

The results are summarised in FIG. 6 (a-c). The graphs plot the relative amounts of crystalline phases from the quantitative XRD analyses and show that the amount of remaining lizardite and formed forsterite is lower when the materials were activated with agitation under vacuum than in the control samples that were heat activated under a nitrogen purge.

In this example a new method is described for testing the relative dissolution performance of the activated mineral. Dissolution behaviour of slurries of heat activated serpentine at constant pH and room temperature were monitored. For this purpose 200 mL of a strong acidic buffer solution of 1M acetic acid and 1M sodium acetate were prepared. The solution were poured into a beaker and mixed well throughout the reaction using a magnetic stirrer. A pH meter and a thermocouple were employed to monitor the pH and temperature of the solution at all times. At time 0 (t0) 1 g of solid heat activated sample were added to the solution. At certain times (0, 5, 10, 15, 20, 30, 45, 60, 90, 120, 180, 240, 300, 360, 420 min) 1 mL of slurry samples were taken from the top of the solution using a 1 mL plastic syringe. The slurry was then filtered through a 0.22 μm syringe filter to remove all solid particles. The liquid sample was further analysed by ICP-OES (Varian 715-ES) to measure the concentration of Mg, Si and Fe elements. FIG. 7 shows a schematic diagram of the experimental set-up for dissolution experiments. The pH of the buffer solution was 4.6 at the start of the experiments and remained almost constant throughout the dissolution reaction. The buffer was strong enough and changes in the pH of the solution were less than 0.1 after 7 h dissolution of Mg.

Figure 8:
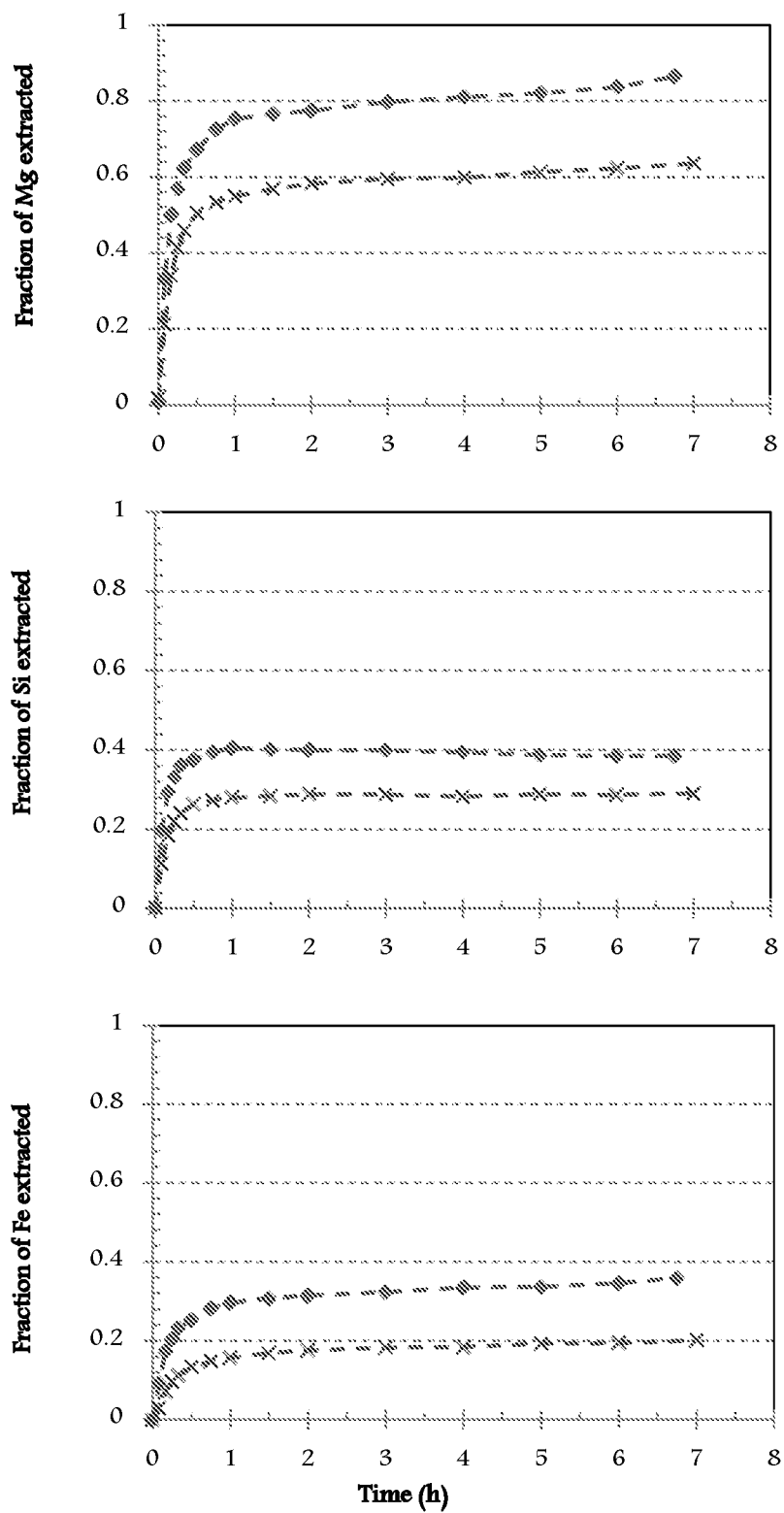

The results of the dissolution test are shown in FIG. 8. It is seen that the solubilities of the metal species Mg, Si and Fe are all considerably higher in the test samples using the method of agitation under partial vacuum during heat treatment than the control sample which used nitrogen purge gas. The improved solubilities using the method indicate improved reactivity in either single step or two step carbonation processes. The results shown in FIG. 8 are direct evidence of increased reactivity of the mineral in the first dissolution step of a two-step process such as that described by Werner et al.

Figure 9:
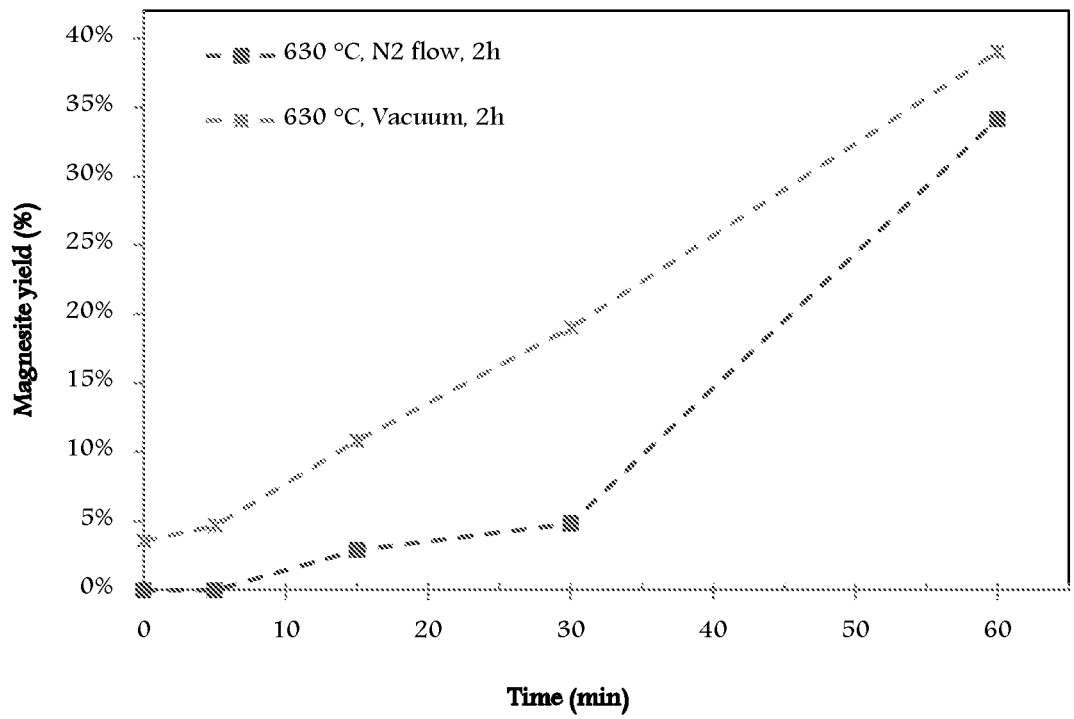

Carbonation of the heat activated samples under the single step conditions described by the ARC/NETL was performed, whereby the activated mineral samples were reacted with carbon dioxide and carbonate and bicarbonate ions in aqueous solution. The results of these tests are plotted in FIG. 9. It can be seen that the yields of magnesite (magnesium carbonate) obtained were increased for the samples that were heat treated with agitation under vacuum using the method described herein, as compared to the control samples that were heat activated under nitrogen purge.

Example 3

In this example the beneficial effect of agitation applied simultaneously with the partial vacuum conditions is demonstrated.

a. Internal Agitation (Using Lifters Inside the Rotary Tube)

In order to reduce non-homogeneity and avoid over heated spots in the heated bed a stainless steel (SS) heating vessel with internal lifters was designed. Four lifters were welded to the internal wall of the tube. The lifters lift up and then allow the particles to tumble thus mixing and agitating the bed effectively. The lifters may also enhance the heat transfer from the walls of the vessel to the particles.

One experiment was performed at 630° C., with 80 l/h flowrate of $N_2$ gas for 2 h. As shown in the table below the results show that agitation due to the lifters effectively reduced the amount of non-dehydroxylated lizardite in the sample. (Note: Liz=lizardite and For=forsterite content by mass)

| Temp (° C.) | Atmosphere/ flowrate (1/h) | Heating time (h) | Tube | Liz (%) | For (%) | Liz + For |
|---|---|---|---|---|---|---|
| 630 | $N_2$/80 | 2 h | No baffles | 14 | 4 | 18 |
| 630 | $N_2$/80 | 2 h | 4 baffles | 5.5 | 7.2 | 12.7 | b. Combining the Effect of Partial Vacuum and Agitation

As expected, combining partial vacuum and agitation improved the heat activation process in terms of increasing the level of dehydroxylation. The results are shown in the table below:

| Temp (° C.) | Atmosphere/ flowrate (1/h) | Heating time (h) | Tube | Liz (%) | For (%) | Liz + For |
|---|---|---|---|---|---|---|
| 630 | Vacuum | 2 h | No baffles | 2.2 | 7.8 | 10 |
| 630 | Vacuum | 2 h | 4 baffles | 1.7 | 7.5 | 9.2 | c. Using SS Balls in a Rotary Kiln to Increase Heat Transfer and Agitation

A further enhancement may be provided by utilising agitation means that enhance heat transfer to the particles during heat activation and thus assist further in achieving higher level of dehydroxylation. Stainless steel (SS) balls (15 mm diameter) were added to the rotary heating vessel. A variety of size was chosen for the SS balls (diameter=15, 12, 10 and 8 mm) and 20 of each size was added to the kiln. Serpentine particles used in this particular test were relatively large with the 90% passing size ($D_{90}$) being 645 μm. The results were compared to the same sample heat activated under similar conditions without the agitation media (SS balls). FIG. 10 is a schematic showing the heating vessel in cross-section.

The XRD patterns of the samples heat activated under similar conditions with and without SS balls were analysed. The results indicated that the latter contains less non-dehydroxylated lizardite as shown in the table below.

|  | Liz (% wt) | For (% wt) |
|---|---|---|
| Heat activated serpentine (no SS media) | 4.2 | 17.4 |
| Heat activated serpentine (with SS media) | 2.7 | 17.1 |

Figure 11:
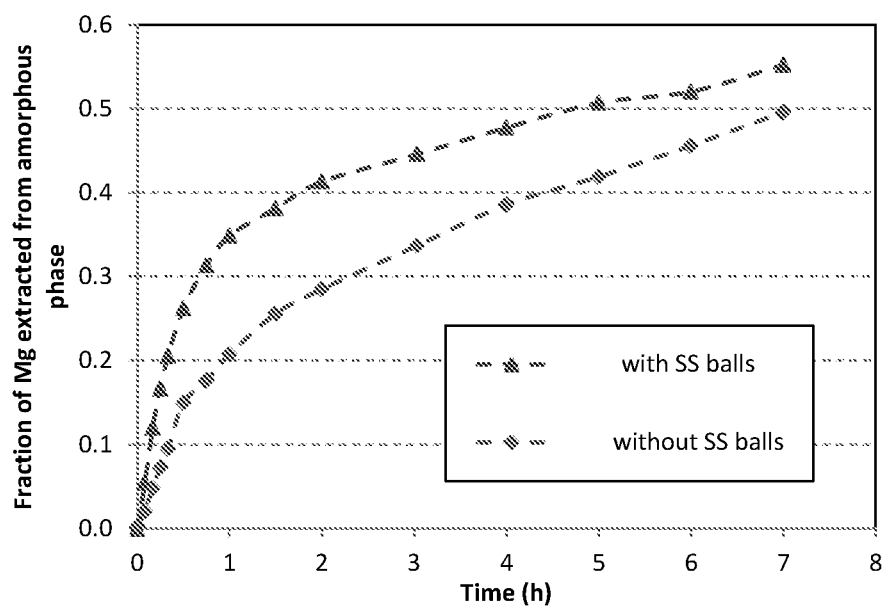

The reactivity of the 2 samples was also determined by measuring the dissolution rate of these samples at pH 4.6 for 7 h. As shown in FIG. 11 the extent of dissolution is 10% higher when mixing balls used during heat activation.

Features of the Invention

Features of the invention include, but are not limited to the following.

A process for mineral carbonation, which process comprises the steps of:

providing a bed of hydroxylated magnesium silicate mineral particles in a heating vessel;

agitating the bed of particles under conditions of a sub-atmospheric pressure and at a temperature of at least 600° C. to produce particles of dehydroxylated magnesium silicate mineral; and reacting the dehydroxylated magnesium silicate mineral with carbon dioxide, carbonate ions and/or bicarbonate ions to form magnesium carbonate.

The said sub-atmospheric pressure (partial vacuum) may be generated, partly or in full, by a condensing heat exchanger, which condenses steam produced during the said dehydroxylation of the mineral.

The sub-atmospheric pressure may be maintained by a combination of a vacuum pump with the said condensing heat exchanger.

The bed of mineral particles may be continuously or sporadically agitated by rotation of the heating vessel.

The bed of mineral particles may be continuously or sporadically agitated by mechanical stirring or vibration or fluidisation or partial fluidisation or by the introduction of a flow of gas or fluid or by combinations thereof.

Solid media to enhance mixing and heat transfer may be added to the bed of mineral particles during agitation. The solid media should remain intact and be inert under the prevailing conditions encountered in the bed. Examples include ceramic or stainless steel balls.

Step (b) of the process may be conducted at a temperature from 620 to 680° C. and at an absolute pressure from 0.5 to 0.005 atmospheres.

Step (b) of the process may be conducted for a time period of at least 10 minutes.

Heat transfer to a fluid or gas may be carried out after the heat activation in step (b) of the process to recover sensible heat from the mineral prior to step (c).

Step (c) of the process may be carried out in an aqueous solution in a single step.

Step (c) of the process may be carried out in an aqueous solution in two steps comprising an initial dissolution step wherein the magnesium is dissolved and a subsequent precipitation step wherein the magnesium carbonate is precipitated.

Step (c) of the process may be carried out in an aqueous solution comprising seawater, brine or a saline solution.

Heat to the heating vessel may be sourced from combustion of a fuel.

Heat from the combustion flue gases from such a process is also recovered and may also be used elsewhere such as in preheating combustion air.

Several stages of heat transfer may advantageously be employed to recovering heat from the mineral and the combustion flue gases.

The hydroxylated magnesium silicate mineral may be serpentine, for example lizardite, antigorite or chrysotile, or mixtures of one or more thereof.

A reactor system adapted to perform the process of the present invention. The reactor system may comprise a heating vessel for receiving a bed of hydroxylated magnesium silicate mineral particles, a mechanism for heating the bed of particles, a mechanism for evacuating the heating vessel to provide sub-atmospheric pressure and a mechanism for agitating particles during heating under sub-atmospheric pressure.

The reactor system may comprise a gas tight rotary kiln furnace that can be evacuated and held under partial vacuum at an absolute pressure of less than or equal to 0.5 atmospheres by a vacuum system.

The reactor system may be fitted with internal structures such as blades, fins or particle lifting structures to ensure that when the kiln is rotated the bed of mineral particles is agitated causing relative motion between particles and between particles and the internal surfaces of the kiln.

The reactor system may comprise a fluidised or partially fluidised bed wherein the outlet pressure of the fluidising gas is sub-atmospheric. The outlet pressure may be below 0.5 atmospheres, for example below 0.2 atmospheres.

The mechanism for evacuating the vessel may comprise a condenser that reduces the pressure in said vessel through condensation of steam exiting said vessel.

The claims defining the invention are as follows:

1. A process for mineral carbonation, which process comprises the steps of:
providing a bed of hydroxylated magnesium silicate mineral particles in a heating vessel;
agitating the bed of particles under conditions of a sub-atmospheric pressure and at a temperature of at least 600° C. to produce particles of dehydroxylated magnesium silicate mineral, thereby generating steam; and
reacting the dehydroxylated magnesium silicate mineral with carbon dioxide, carbonate ions and/or bicarbonate ions to form magnesium carbonate; wherein
the process further comprises condensing the steam by a condensing heat exchanger, thereby reducing the pressure in the heating vessel.

2. The process according to claim 1, wherein the hydroxylated magnesium silicate mineral comprises serpentine.

3. The process according to claim 2, wherein the hydroxylated magnesium silicate mineral comprises lizardite, antigorite or chrysotile, or a mixture thereof.

4. The process according to claim 1, wherein the hydroxylated magnesium silicate mineral has a volume weighted average particle size of up to 5 mm.

5. The process according to claim 1, wherein the temperature in the heating vessel is in the range 600-680° C.

6. The process according to claim 1, wherein the mineral particles are heated in the heating vessel for a period of 10 to 180 minutes.

7. The process according to claim 1, wherein the mineral is cooled after exiting the heating vessel and sensible heat from the dehydroxylated mineral is recovered.

8. The process according to claim 1, wherein heat supplied to the heating vessel is sourced from combustion of a fuel.

9. The process according to claim 8, wherein heat is recovered from combustion gases produced by combustion of the fuel.

10. The process according to claim 1, wherein formation of the magnesium carbonate occurs in a single step or two step carbonation process.

11. The process according to claim 1, wherein the formation of the magnesium carbonate occurs in an aqueous slurry.

12. The process according to claim 1, wherein the mineral particles are preheated to a temperature of 200° C. to 500° C. before heating to produce particles of dehydroxylated magnesium silicate mineral.

13. The process according to claim 12, wherein heating or cooling is conducted using a series of heat exchange stages.

14. A reactor system adapted to perform the process of claim 1, the reactor system comprising:
- a heating vessel for receiving a bed of hydroxylated magnesium silicate mineral particles, the heating vessel adapted to generate steam,
- a heating mechanism for heating the bed of particles,
- an evacuating mechanism for evacuating the heating vessel to provide sub-atmospheric pressure, wherein the evacuating mechanism comprises a condensing heat exchanger adapted to condense steam, thereby reducing the pressure in the heating vessel, and
- an agitating mechanism for agitating particles during heating under sub-atmospheric pressure.

15. The reactor system according to claim 14, comprising a gas-tight rotary kiln furnace that can be evacuated and held under partial vacuum at an absolute pressure of less than 0.5 atmospheres by a vacuum system.

16. The reactor system according to claim 15, wherein the rotary kiln furnace comprises internal structures to ensure that when the kiln is rotated the bed of mineral particles is agitated causing relative motion between particles and between particles and the internal surfaces of the kiln.

17. The reactor system according to claim 14, comprising a fluidised or partially fluidised bed.

18. The reactor system according to claim 14, which contains solid media to enhance mixing and heat transfer in the reactor system during agitation.

* * * * *